W. BULLOCK, Dec'd.

R. VOSE, Administrator, Assignor to BULLOCK PRINTING PRESS CO.

Machine for Damping Paper.

No. 8,145. Reissued March 26, 1878.

Witnesses:

E. A. Sick

W. T. Hutchinson

William Bullock
Inventor.
Bullock Printing Press Company
by A. Pollok its
attorney.

UNITED STATES PATENT OFFICE.

BULLOCK PRINTING PRESS COMPANY, OF PHILADELPHIA, PENNSYLVANIA, ASSIGNEE OF RICHARD VOSE, ADMINISTRATOR OF WILLIAM BULLOCK, DECEASED.

IMPROVEMENT IN MACHINES FOR DAMPING PAPER.

Specification forming part of Letters Patent No. 171,093, dated December 14, 1875; Reissue No. 8,145, dated March 26, 1878; application filed December 8, 1877.

*To all whom it may concern:*

Be it known that WILLIAM BULLOCK, late of Philadelphia, in the State of Pennsylvania, did in his lifetime invent a certain new and useful Machine for Dampening Paper; and that the following, taken in connection with the drawings, is a full, clear, and exact description of the same.

Figure 1:
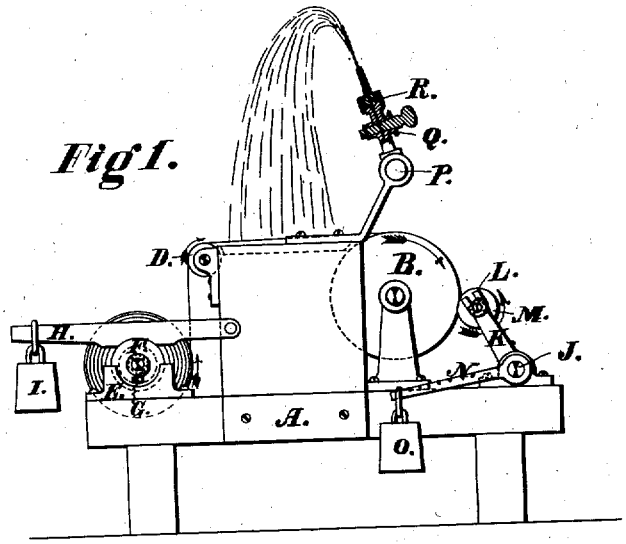
Figure 2:
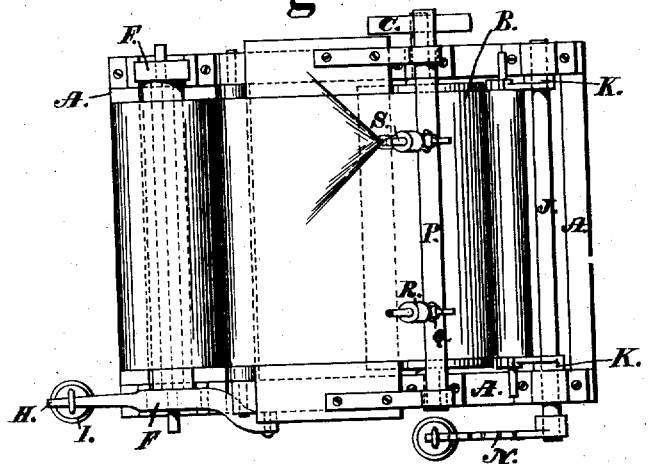

In the drawings, Figure 1 is a side elevation of the machine in its preferred form, showing the spray-pipes in section; and Fig. 2 is a plan of the same.

The machine was designed for dampening paper in long lengths, which was afterward to be printed in a machine; and the machine consists, essentially, of a spool upon which the paper is wound of spray or jet pipes, or apparatus for sprinkling the paper, and of apparatus for winding up the paper upon a spool after it has been dampened.

None of the parts of the machine, considered separately and by themselves, are new. The novelty consists only in the combination of old parts, and, in fact, the identical apparatus shown in the machine for winding up the dampened paper was patented by the said Bullock and others in Letters Patent granted to William Bullock, Calvin Adams, and George S. Selden, dated April 14, 1863, No. 38,200; but this apparatus was applied in the machine described in that patent to the delivery of dampened paper to a printing-press.

In the drawings, the frame of the machine is shown at A A. At one end of this frame there are journal-bearings E E, which support rollers or wheels F F. These rollers have holes through them at their centers, and in these holes is to be introduced a shaft, on which the spool containing the dry paper is sustained. These rollers are provided with set-screws G G, so that the shaft may be fastened therein, to cause the rollers and spool to turn together. Levers H H, pivoted at one end, and having hung from them weights I I, rest upon these rollers; and by means of the weights friction may be applied, so as to regulate the tension upon the paper in its passage from the delivery to the winding-up apparatus. In consequence of this construction the friction is applied upon the parts detachable from the spool, and therefore different spools may be applied, one after the other, while the same friction apparatus answers for all the spools. This was the preferred construction of Bullock; but it is evident that friction might be applied to some disk permanently fastened to the spool. From this delivery-spool the paper passes over a roller, D, this roller being used merely because the delivery-roll lies below the table or platform of the machine. This table or platform, the object of which is merely to prevent the paper from sagging, may be made to occupy, as nearly as practicable, the space between the upper sides of the roller D and the driving-roll B, so as to be flush with or tangent to the said rollers, or nearly so, substantially as shown in the drawings.

As the paper passes along it is treated with a fine spray of water thrown upon the paper in such minute particles as to admit of the requisite quantity without causing the paper to wrinkle, as would be the case if applied in streams or drops.

In the machine shown in the drawings the spray of water is thrown out through the nozzles R R, which are provided with cocks Q Q, to regulate the amount of water which is supplied to them through the pipe P, and are also movable in a sort of ball-and-socket joint, so that the direction of the jet may be varied. The cap S on the nozzle R serves to break up the jet into fine spray, and to deflect the same upon the paper.

The table or platform is a flat or nearly flat surface, and sustains the paper, if it should tend to drop when wet. The spool upon which the wet paper is wound is shown at L M. Its shaft rests in slots formed in the ends of arms K K, which are secured upon a rock-shaft, J, pivoted on the frame, the arrangement being such that the weight of the spool of paper is partly borne by the driving-roller B, and partly by its own journal-bearings, and the axis of the spool, while accumulating paper, may recede from the driving-roll without losing its contact therewith, the axes of the roll and spool remaining parallel with each other while the paper is accumulating on the spool.

The paper is wound up, owing to the fact that the surface of the paper on the spool is in contact with the surface of this driving-roller, and, under the arrangement shown in the drawings, as the quantity of paper upon the winding-up spool increases, the proportion of its weight resting upon roller B diminishes, and this is an important feature of this arrangement of the contrivance, and it is clear that, owing to the fact that both arms K are secured to the same shaft, neither arm can move away without the other moving with it, and this feature causes the two ends of the shaft of the spool upon which the damp paper is wound, and consequently the spool, to move parallel to itself.

In order to regulate, if desired, the pressure upon the roller B of the spool upon which the damp paper is wound, BULLOCK applied to the rock-shaft J an arm, N, with weight O, and it is evident that by adjusting that weight on the arm the amount of pressure of the paper-spool upon the driving-roller B may be varied.

Having fully described the machine as BULLOCK constructed it and its mode of operation, what is claimed as of BULLOCK'S invention is—

1. A machine for dampening printing-paper, consisting, essentially, of a spool upon which the paper is wound, an apparatus for throwing a spray of water on the paper, and an apparatus for winding up the paper upon a spool when dampened, substantially as hereinbefore set forth.

2. The process, substantially as hereinbefore set forth, of converting a web-roll of dry printing-paper into a web-roll of dampened paper suitable for printing upon, by means of unrolling, spraying upon the paper as it moves along, and rerolling the web of paper into a dampened roll, said process being continuous, as described.

3. The combination, substantially as described, of the spool of dry paper, a tension apparatus adapted to control the unwinding of the dry paper, an apparatus for throwing a spray of water upon the paper, and an apparatus for winding up the paper upon a spool when dampened.

4. The combination, substantially as described, of a spool upon which the dry paper is wound, a tension apparatus adapted to control the unwinding of the dry paper, an apparatus for throwing a spray of water upon the paper, and a driving-cylinder and winding-up spool, arranged with relation to each other, substantially as described, so as to adjust themselves so as to permit the axis of the spool of paper to recede from the axis of the driving-roll while their peripheries are in contact.

5. The combination, substantially as hereinbefore set forth, of a delivery-spool of dry printing-paper, an apparatus for throwing a spray of water on said paper, a driving-roller, and a winding-up spool for holding the dampened paper, mounted on bearings, arranged substantially as described in reference to the driving-roller, so that part of its weight is sustained by the driving-roller and part by the journals of its own shaft, said journals being so supported as to adapt themselves to the increase in diameter of said dampened paper roll, for the purposes described.

6. The combination of a delivering-spool, a driving-roller, and a winding-up spool mounted on arms whose axes are arranged with reference to the driving-roll, as described, with an apparatus for throwing a spray of water upon the paper in its passage from the delivering-spool to the winding-up spool, the combination being and acting substantially as set forth.

7. The combination of a delivering-spool, a driving-roller, and a winding-up spool mounted on arms whose axes are arranged with reference to the driving-roll, as described, with a table or platform located between the delivery-spool and the winding-up spool, the combination being substantially such as set forth.

8. The combination, substantially as described, of a delivering-spool, a table, a jet-nozzle, a driving-roll, and winding-up spool mounted on arms whose axes are arranged with reference to the driving-roll, as described.

9. The combination of the following elements, viz., a winding-up roll, weights to regulate the pressure thereof upon a driving-roll, a delivery-roll, and nozzles and jet-pipes, the combination being substantially as described.

In testimony whereof I, FRANK B. WILLIAMS, as secretary and executive officer of the BULLOCK PRINTING PRESS COMPANY, have signed my name to this specification this 7th day of December, A. D. 1877.

FRANK B. WILLIAMS,
*Secretary Bullock Printing Press Co.*

Witnesses:
E. A. DICK,
BERTRAM ZEVELY.